(12) United States Patent
Wakai

(10) Patent No.: US 9,898,692 B2
(45) Date of Patent: Feb. 20, 2018

(54) PRINTING APPARATUS, PRINTING CONTROL APPARATUS, PRINTING SYSTEM, CONTROL METHOD OF PRINTING APPARATUS, AND STORAGE MEDIUM

(71) Applicant: CANON KABUSHIKI KAISHA, Tokyo (JP)

(72) Inventor: Kazuo Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/662,030

(22) Filed: Mar. 18, 2015

(65) Prior Publication Data

US 2015/0269461 A1   Sep. 24, 2015

(30) Foreign Application Priority Data

Mar. 20, 2014  (JP) .................................. 2014-058489

(51) Int. Cl.
*G06K 15/02* (2006.01)
*G06K 15/00* (2006.01)

(52) U.S. Cl.
CPC ..... *G06K 15/1868* (2013.01); *G06K 15/1806* (2013.01); *G06K 15/402* (2013.01); *G06K 15/4065* (2013.01)

(58) Field of Classification Search
CPC ........... G06K 15/1868; G06K 15/4065; G06K 15/1872; G06K 15/402; G06K 15/1806
USPC ....................... 358/1.6, 1.15, 3.24
See application file for complete search history.

(56) References Cited

U.S. PATENT DOCUMENTS

| 7,019,851 | B2 * | 3/2006 | Kanazawa | G03G 15/50 |
| | | | | 358/1.12 |
| 7,253,920 | B2 * | 8/2007 | Hosoda | G03G 15/6538 |
| | | | | 358/1.15 |
| 8,786,884 | B2 * | 7/2014 | Maeda | G06F 3/1205 |
| | | | | 358/1.15 |
| 9,013,751 | B2 * | 4/2015 | Inui | G06K 15/02 |
| | | | | 358/1.12 |
| 2012/0057203 | A1 * | 3/2012 | Maeda | G06F 3/1205 |
| | | | | 358/1.15 |

(Continued)

FOREIGN PATENT DOCUMENTS

JP  2007-241425 A   9/2007
JP  2007-324983 A   12/2007

*Primary Examiner* — Allen H Nguyen
(74) *Attorney, Agent, or Firm* — Canon U.S.A., Inc. IP Division

(57) ABSTRACT

A printing apparatus includes a first receiving unit, an obtaining unit, a sending unit, a second receiving unit, and a setting unit. The first receiving unit receives, from a printing control apparatus, an instruction to obtain first attribute information of a sheet held in a sheet holding unit. The obtaining unit obtains the first attribute information in accordance with the instruction received by the first receiving unit. The sending unit sends the first attribute information obtained by the obtaining unit to the printing control apparatus. The second receiving unit receives, from the printing control apparatus, second attribute information based on the first attribute information sent from the sending unit. The setting unit sets the second attribute information, received by the second receiving unit, as attribute information of a sheet held in the sheet holding unit.

16 Claims, 14 Drawing Sheets

(56) References Cited

U.S. PATENT DOCUMENTS

2015/0015916 A1\* 1/2015 Kikuchi ............ G06K 15/1848
358/3.24
2015/0160903 A1\* 6/2015 Mihira .................. G06F 3/1257
358/1.6

\* cited by examiner

FIG. 5

| STANDARD SIZE | WIDTH (mm) | HEIGHT (mm) |
|---|---|---|
| B5 | 182 | 257 |
| EXEC | 184 | 267 |
| 16K | 195 | 270 |
| A5-R | 210 | 148.5 |
| A4 | 210 | 297 |
| STMT-R | 215.9 | 139.7 |
| LTR | 215.9 | 279.4 |
| B5-R | 257 | 182 |
| 16K-R | 270 | 195 |
| LTR-R | 279.4 | 215.9 |
| A4-R | 297 | 210 |
| LGL | 355.6 | 215.9 |
| B4 | 364 | 257 |
| 8K | 390 | 270 |
| A3 | 420 | 297 |
| LDR | 431.8 | 279.4 |
| SRA3 | 450 | 320 |
| 12×18 | 457.2 | 304.8 |
| 13×19 | 483 | 330.2 |

FIG. 6

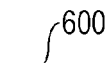

| ID | NAME | SIZE | GRAMMAGE | TYPE | COLOR |
|---|---|---|---|---|---|
| 001 | MEDIUM A | A4 | 62 g/m² | PLAIN PAPER | WHITE |
| 002 | MEDIUM B | B4 | 62 g/m² | PLAIN PAPER | WHITE |
| 003 | MEDIUM C | LTR | 80 g/m² | PLAIN PAPER | WHITE |
| 004 | MEDIUM D | A3 | 128 g/m² | HEAVY PAPER | WHITE |
| 005 | MEDIUM E | 217×281 | 80 g/m² | COATED PAPER | WHITE |
| 006 | MEDIUM F | 214×276 | 150 g/m² | HEAVY PAPER | WHITE |
| 007 | MEDIUM G | LTR | 80 g/m² | PLAIN PAPER | RED |
| 008 | MEDIUM H | A4 | 128 g/m² | HEAVY PAPER | WHITE |
| 009 | MEDIUM I | 200×250 | 80 g/m² | PLAIN PAPER | WHITE |
| 010 | MEDIUM J | A4 | 80 g/m² | PLAIN PAPER | YELLOW |
| 011 | MEDIUM K | LTR | 300 g/m² | HEAVY PAPER | WHITE |
| ... | ... | ... | ... | ... | ... |

FIG. 8A

SHEET REGISTRATION — 800, 802

| ID  | NAME     | SIZE    | GRAMMAGE  | TYPE         | COLOR |
|-----|----------|---------|-----------|--------------|-------|
| 001 | MEDIUM A | A4      | 62 g/m²   | PLAIN PAPER  | WHITE |
| 002 | MEDIUM B | B4      | 62 g/m²   | PLAIN PAPER  | WHITE |
| 003 | MEDIUM C | LTR     | 80 g/m²   | PLAIN PAPER  | WHITE |
| 004 | MEDIUM D | A3      | 128 g/m²  | HEAVY PAPER  | WHITE |
| 005 | MEDIUM E | 217×281 | 80 g/m²   | COATED PAPER | WHITE |

[ADD] — 801    [DELETE]    [CLOSE]

FIG. 8B

NEW ADDITION — 810

NAME: [ MEDIA G ]

GRAMMAGE, TYPE, COLOR: [ 80 g/m², PLAIN PAPER, RED ▼ ]  [CUSTOM...]

OUTPUT SHEET SIZE: [ LTR ▼ ]  [CUSTOM...]

[REGISTER] — 811    [CANCEL]

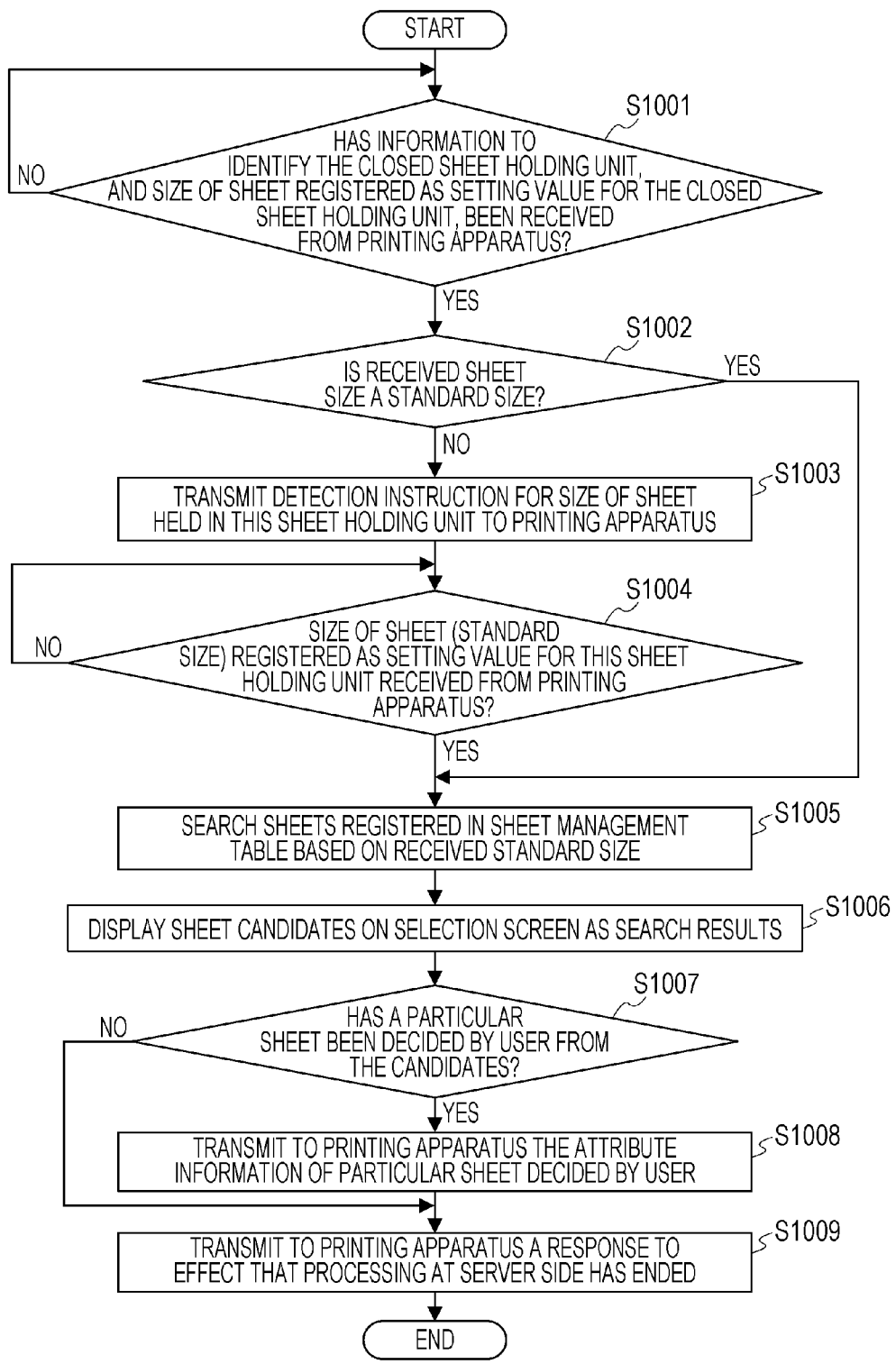

PRINTING APPARATUS, PRINTING CONTROL APPARATUS, PRINTING SYSTEM, CONTROL METHOD OF PRINTING APPARATUS, AND STORAGE MEDIUM

BACKGROUND OF THE INVENTION

Field of the Invention

The present invention relates to a printing apparatus, a printing control apparatus, a printing system, a control method of the printing apparatus, and a storage medium.

Description of the Related Art

There is known a technology in printing apparatuses in which the size of a sheet held in a sheet holding unit is detected by a sensor, and automatically registered as a setting value of the sheet holding unit. For example, the size of a sheet is detected using a sensor which detects the positions of guides placed against the sides of a sheet.

Adding sensors for detecting non-standard sizes in addition to sensors for detecting standard sizes leads to increased costs. Such cost-related constraints may result in a printing apparatus having sensors for detecting standard sizes by not having sensor for detecting non-standard sizes. Accordingly, when loading sheets of a non-standard size in a sheet holding unit, the user registers the width and height of the non-standard sheets from an operation unit. If the printing apparatus has been set to detect the size of sheets by the sensors, the user registering the non-standard size as a setting value for the sheet holding unit will overwrite the standard size detected by the sensors. Accordingly, there are printing apparatuses which can be set to where the size of a sheet held in a sheet holding unit is not detected by the sensors.

Further, it is common to register sheet attribute information such as the name of a sheet, the size of the sheet, the grammage of the sheet, the surface nature of the sheet, the color of the sheet, and so on, as setting values for the sheet holding unit. The printing apparatus controls the temperature of the fixing unit and the conveyance speed sheet based on the grammage of the sheet. However, it is troublesome to input sheet attribute information every time for each sheet holding unit in order to register sheet attribute information as setting values for the sheet holding unit.

Accordingly, there is known a technology where this attribute information for each sheet is stored in a sheet management database beforehand, with the user selecting the sheet attribute information of a desired sheet therefrom and registering this as the setting values of the sheet holding unit (see Japanese Patent Laid-Open No. 2007-241425).

There also is known a technology where sensors detect the size of a sheet held in a sheet holding unit, and sheets matching the detected size are displayed as candidates. The user selects the desired sheet attribute information from the candidates, and register as the setting values of the sheet holding unit (see Japanese Patent Laid-Open No. 2007-324983).

However, in a case where the printing apparatus has been set to not detect the size of sheets held in the sheet holding unit using sensors, registering sheet attribute information stored beforehand as attribute information of sheets stored in the sheet holding unit has not been easy.

SUMMARY OF THE INVENTION

According to an aspect of the present invention, a printing apparatus includes a first receiving unit configured to receive, from a printing control apparatus, an instruction to obtain first attribute information of a sheet held in a sheet holding unit, an obtaining unit configured to obtain the first attribute information in accordance with the instruction received by the first receiving unit, a sending unit configured to send the first attribute information obtained by the obtaining unit to the printing control apparatus, a second receiving unit configured to receive, from the printing control apparatus, second attribute information based on the first attribute information sent from the sending unit, and a setting unit configured to set the second attribute information, received by the second receiving unit, as attribute information of a sheet held in the sheet holding unit.

Further features of the present invention will become apparent from the following description of exemplary embodiments with reference to the attached drawings.

BRIEF DESCRIPTION OF THE DRAWINGS

FIG. 5 is a diagram illustrating an example of a standard size table.

FIG. 6 is a diagram for describing a sheet management table stored in a hard disk drive unit in the server according to the first embodiment.

FIGS. 8A and 8B are diagrams illustrating examples of setting screens displayed on an operation unit of the server according to the first embodiment.

FIG. 10 is a flowchart for describing processing of deciding a particular sheet from sheets registered in the sheet management table in the server according to the first embodiment.

DESCRIPTION OF THE EMBODIMENTS

Embodiments of the present invention will be described in detail with reference to the attached drawings. It should be noted that the embodiments do not restrict the present invention, and that the scope of the present invention is to be interpreted according to the claims. Also, not all combinations of features described in the embodiments are necessarily essential to the present invention.

First Embodiment

Digital Printing System

Figure 1:
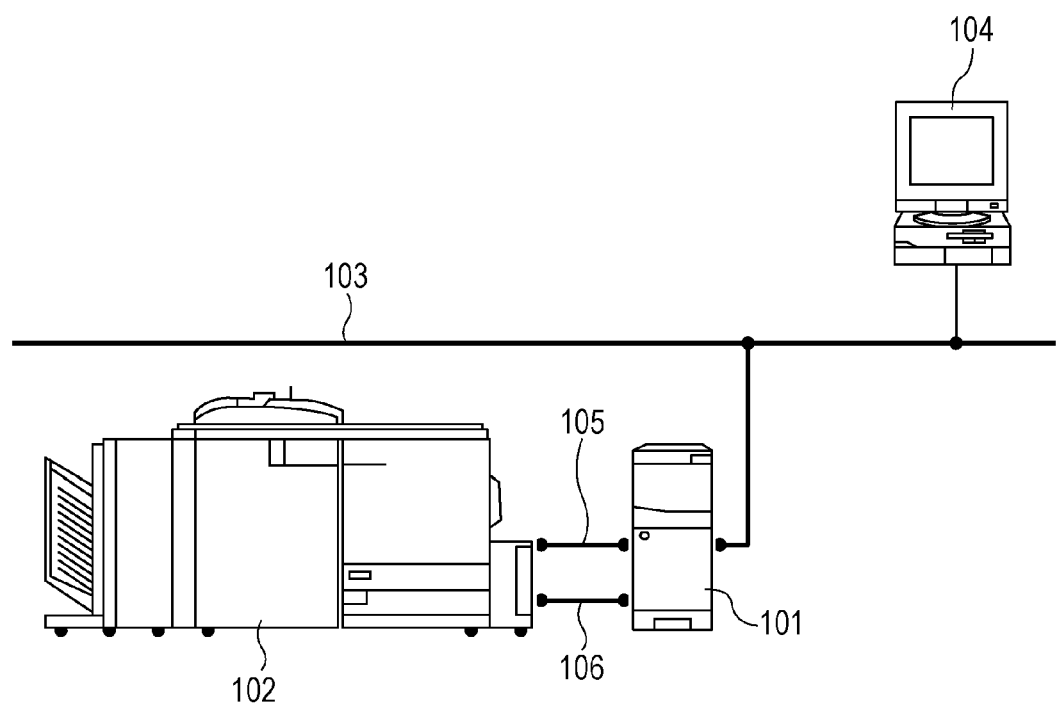
FIG. 1 is a diagram for describing a digital printing system according to a first embodiment of the present invention.

A digital printing system according to a first embodiment of the present invention will be described with reference to FIG. 1. The printing system according to the first embodiment includes a printing apparatus, and a server communicable with the printing apparatus. A user first stores attribute information of sheets (size, grammage, type, color, etc.) in a serve beforehand. In a case where a sheet holding unit provided to a printing apparatus has been set so that sensors do not detect the size of sheets held in the sheet holding unit, the server sends an instruction to the printing apparatus, to cause the sensors to detect the size of sheets held in the sheet holding unit. Accordingly, even in a case where the sheet holding unit has been set so that sensors do not automatically detect the size of sheets held in the sheet holding unit, sheet attribute information stored beforehand can be easily registered as attribute information of sheets held in the sheet holding unit. Details will be described next.

A digital printing machine (printing apparatus) 102 has various functions such as scanning, printing, copying, and so forth. A server 101 has various functions, such as image processing, printing control, job management, and so forth. The server 101 accepts a print job, and analyzes printing settings of the received job, for example. Rendering processing of the image data which is to be printed can be performed based on the print settings of the job that has been analyzed. An information processing apparatus (computer) 104 has functions such as editing application files, giving printing instructions, and so forth.

In the digital printing system, the printing apparatus 102 and server 101 are connected via a network 105 and video cable 106. Also, the server 101 and information processing apparatus 104 are communicably connected by a network 103 such as a local area network (LAN) or the like. The video cable 106 is used to transfer print images, and the network 105 is used to exchange other information. Unless specifically stated otherwise, the network 103 used to connect the server 101 and the information processing apparatus 104 may also be a wide area network (WAN), wireless LAN, or another like network, as long as functions of the present invention can be executed. The network 105 used to connect the printing apparatus 102 and the server 101 may be a network such as a LAN, WAN, or the like.

In the embodiment of the present invention, the information processing apparatus 104 exchanges various types of data with the printing apparatus 102 via the server 101. The server 101 also processes printing jobs received from the information processing apparatus 104 connected thereto by a network 103, and to the printing apparatus 102. The user can confirm job status, state of the server 101 and printing apparatus 102, and so forth, using the information processing apparatus 104. The user can also save attribute information of sheets, as setting values for sheet holding units of the printing apparatus 102, in the printing apparatus 102 for example, by directly or remotely operating the server 101.

Note that in a case where the information processing apparatus 104 takes on the role of operations of the server 101, the information processing apparatus 104 and printing apparatus 102 may directly exchange data and commands. In such a case, the configuration of the information processing apparatus 104 is the same as the configuration of the server 101 except for being connected to the printing apparatus 102 by the network 105 and video cable 106.

Server Configuration

Figure 2:
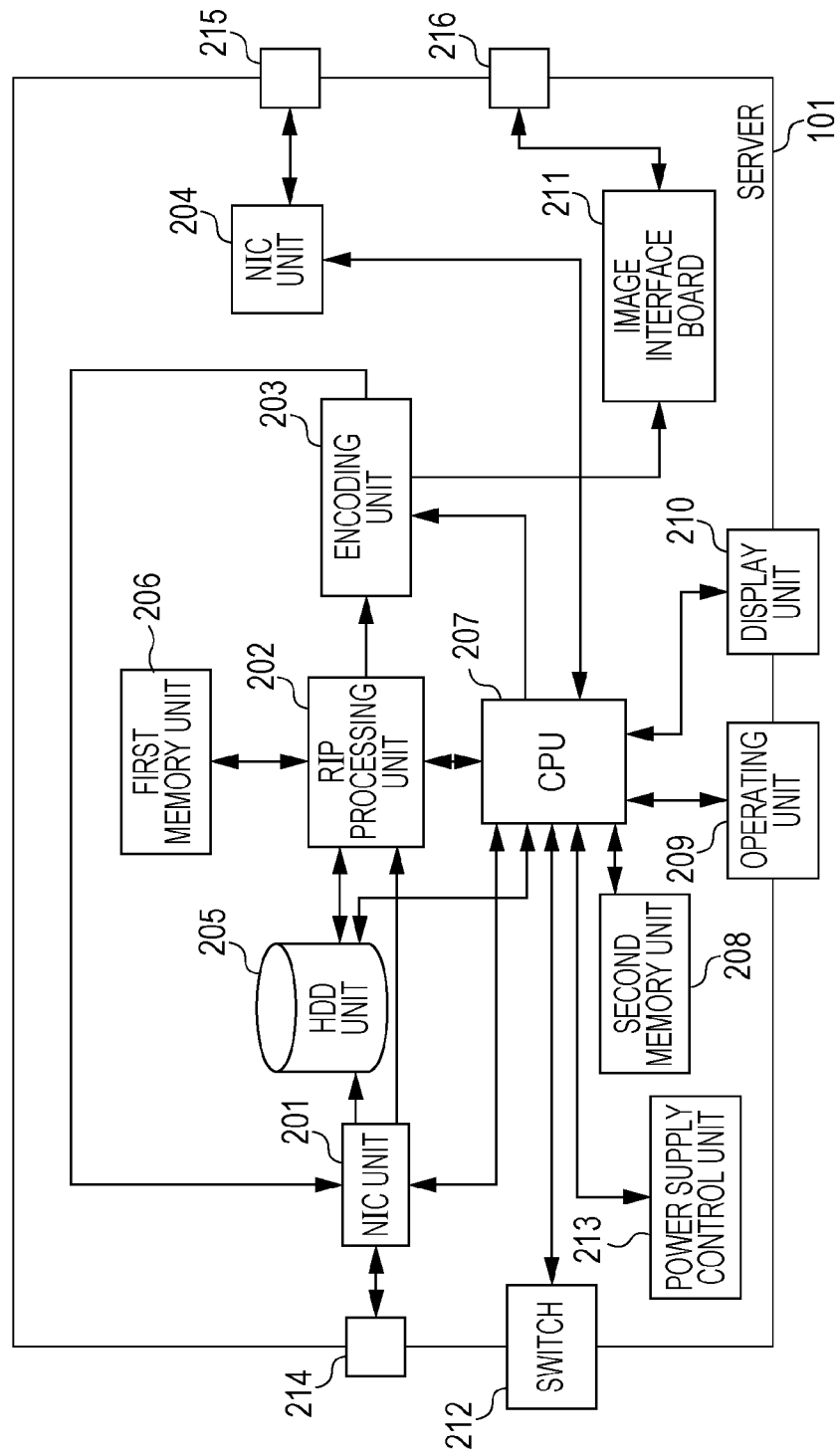
FIG. 2 is a block diagram illustrating the configuration of a server according to the first embodiment.

An example of the configuration of the server 101 according to the first embodiment of the present invention will be described with reference to FIG. 2.

A Network Interface Card (NIC) unit 201 is a first network interface which controls communication over the network 103. On the other hand, a NIC unit 204 is a second network interface which controls communication over the network 105. The NIC unit 201 and NIC unit 204 may control communication over a wireless LAN as well.

A raster image processor (RIP) 202 performs processing to rasterize a print language such as Page Description Language (PDL) data or data of a particular data format that has been received by the NIC unit 201. An encoding unit 203 performs processing to convert rasterized data into print data or other data of a format which the printing apparatus 102 supports.

A hard disk drive (HDD) unit 205, which is a storage unit, temporarily stores (spools) the PDL data received by the NIC unit 201. The HDD unit 205 also temporarily stores post-RIP compressed data. The HDD unit 205 holds data stored in a later-described sheet management table 600 illustrated in FIG. 6, and also holds system software for carrying out the later-described processes. Data stored in the sheet management table 600 may be held in nonvolatile memory such as a solid state drive (SSD), instead of the HDD unit 205.

A central processing unit (CPU) 207 controls the processes, operations, and so forth of the various units of the server 101. A first memory unit 206 is used for the RIP 202 to perform image rending processing. On the other hand, a second memory unit 208 is used by the CPU 207 as a temporary data storage area.

An operation unit 209 has buttons, keys, a touch panel, and so forth, and is used to perform operations on the server 101. A display unit 210 performs processing to convey information to the user through images and text. An image interface board 211 and a connector 216 for the image interface board 211 are used to create image data, and transfer over a dedicated transfer path. A switch 212 is used to for power supply shutdown and power supply activation operations by the user. Upon the switch 212 having been operated, an interrupt signal is delivered to the CPU 207. Upon detecting the interrupt signal, the CPU 207 controls a power supply control unit 213 in accordance with the current state.

Data packets from the information processing apparatus 104 to the server 101 are conveyed over the network 103 and input to the server 101 via a connector 214. Data reception processing is performed within the server 101 at the NIC unit 201. Upon receiving print data, received data is written to the HDD unit 205 as necessary, under control of the CPU 207. This is queuing (spooling), which is commonly performed to improve the data transfer rate. The data stored in the HDD unit 205 is read out by the RIP 202 under instruction by the CPU 207.

Next, encoding is performed at the encoding unit 203, serving as a data format converting unit, into a data format acceptable by the printing apparatus 102, based on a data format acceptable by the printing apparatus 102 that has been set beforehand, and the received data format. The data after encoding must be in a format acceptable at the printing apparatus 102. Examples of the format include particular printing language formats, data formats where compression has been performed by a particular method such as JBIG or the like, and so forth, but an acceptable format depends on the capabilities of an interpreting unit built into the printing apparatus 102. The data thus encoded is packetized by the NIC unit 204 again, for sending to the network 105. The packetized data is sent from the connector 215 and sent over the network 105 to the printing apparatus 102.

The encoded data may be sent to the printing apparatus 102 over a local interface such as a Universal Serial Bus (USB) or the like. The printing apparatus 102 which has received the data packets performs printing processing onto a printing medium such as a sheet or the like, following its own print process procedures. Another data transfer method includes the data being transferred to the image interface board 211 via the encoding unit 203, and then being sent from the connector 216. The data is then sent to the printing apparatus 102 via the video cable 106. State information, relating to the power supply state of the server 101 and printing apparatus 102, whether the server 101 and printing apparatus 102 are in a normal activation state, and so forth, is obtained in a timely fashion, and the information processing apparatus 104 sends data packets to the server 101, based on determination made from the obtained power supply state and activation state. Performing poling, where the power supply state of the server 101 and printing apparatus 102 and whether or not in a normal activation state is obtained at certain time intervals, enables state change notification packets sent by the server 101 and printing apparatus 102 to be received, and the information processing apparatus 104 changes processing accordingly. As one example, in a case of the information processing apparatus 104 receiving a power supply state notification packet, which is sent in a case where the printing apparatus 102 has shut down the power supply, the information processing apparatus 104 stops poling, so as to not place unnecessary traffic on the network.

Configuration of Printing Apparatus

Figure 3:
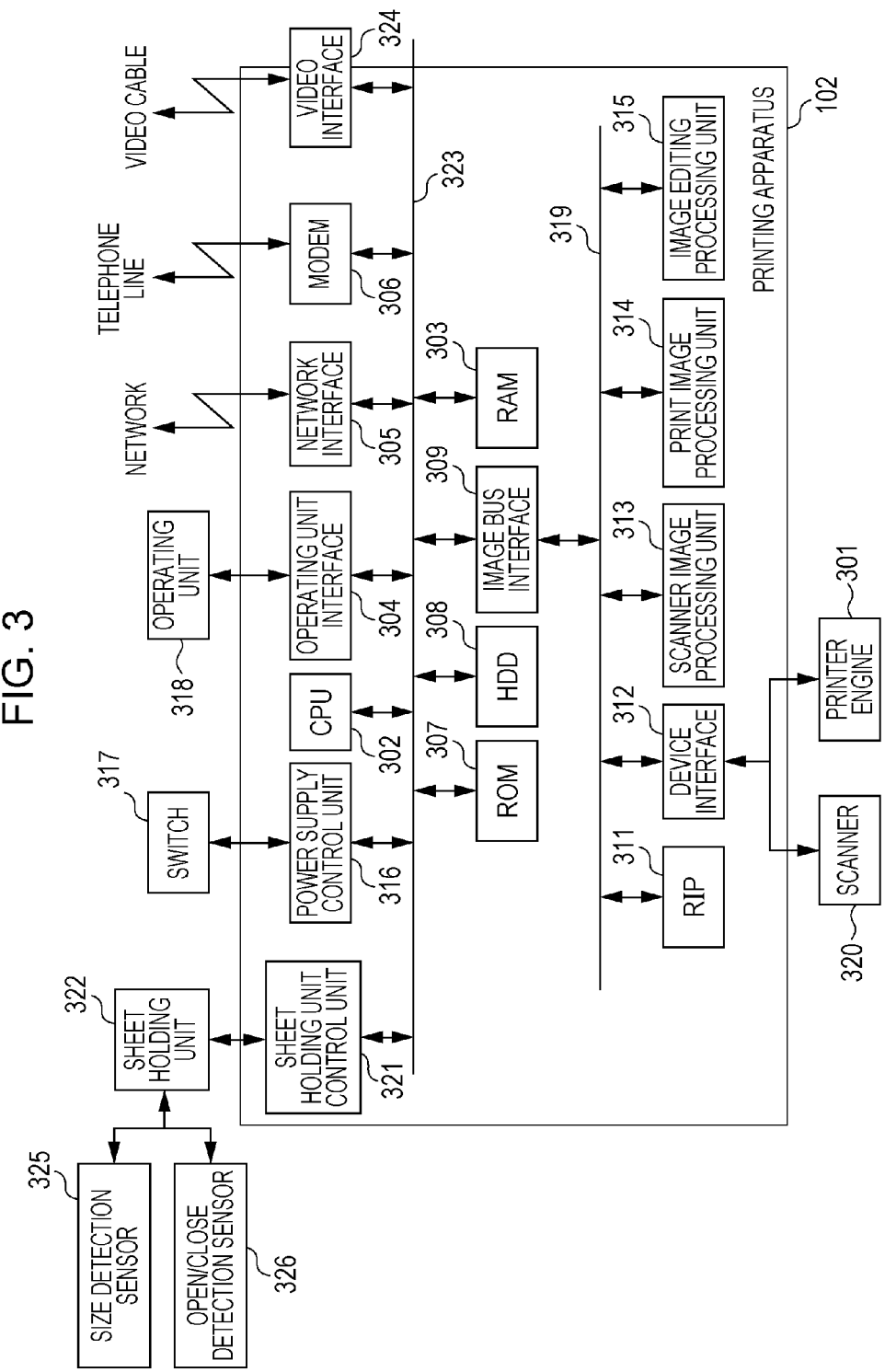
FIG. 3 is a block diagram illustrating the configuration of a printing apparatus according to the first embodiment.

An example of the configuration of the printing apparatus 102 according to the first embodiment of the present invention will be described with reference to FIG. 3. The printing apparatus 102 is connected to a scanner 320 which is an image input device, a printer engine 301 which is an image output device, so as to perform control regarding reading of image data and printing output. The printing apparatus 102 can also control input/output of image information and device information over a network or video cable, by being connected to the network, a telephone line, and the video cable.

A CPU 302 is to control the overall printing apparatus 102. Random access memory (RAM) 303 serves as system work memory used when the CPU 302 is operating, and is image memory which temporarily stores input image data. Read-only memory (ROM) 307 is boot ROM storing a system boot program. An HDD 308 is a hard disk drive which stores system software used for performing the later-described various types of processing, and input image data and so forth. The HDD 308 also holds setting information from the operation unit 318 and setting information received from the server 101, and attribute information such as sheet size and so forth stored in the sheet holding unit 322. Note that system software for the various types of processing, and image data that have been input, may be held in nonvolatile memory such as an SSD, instead of the HDD unit 308.

An operation unit interface 304 is an interface for an operation unit 318 having a display screen which can display image data and so forth. The operation unit interface 304 outputs operation screen data to the operation unit 318, and also serves to communicate information which the user has input from the operation unit 318 to the CPU 302. Note that the operation unit 318 is configured including a touch panel unit, and key input section, which are omitted from illustration. The operation unit 318 thus serves as various interfaces for the user to perform settings and operations of the printing machine 102 according to the first embodiment. A network interface 305 is realized by a LAN card for example, and performs input/output of information with regard to external devices by being connected to a network. Input/output between the printing apparatus 102 and external devices is not restricted to networks such as LANs and WANs, and may be carried out over a wireless LAN or the like. A modem 306 is connected to a telephone line, and performs input/output of information with regard to external devices. A video interface 324 is connected to a video cable, and performs input/output of information with regard to external devices. The above-described units are arranged on a system bus 323.

An image bus interface 309 is an interface for connecting the system bus 323 to an image bus 319 which transfers image data at a high speed, and serves as a bus bridge which converts data structure. Connected to the image bus 319 are a raster image processor (RIP) 311, a device interface 312, a scanner image processing unit 313, a printer image processing unit 314, and an image edit processing unit 315. The RIP 311 renders PDL data into raster images.

The device interface 312 transfers image data input from the scanner 320 to the HDD 308. The device interface 312 also transfers the image data to the printer engine 301. An arrangement may be made in the embodiment where the image data input from the scanner 320 is transferred to the HDD 308 under an instruction from the CPU 302, without going through the device interface 312. In the same ways, an arrangement may be made in the embodiment where image data is transferred to the printer engine 301 under an instruction from the CPU 302, without going through the device interface 312. The scanner image processing unit 313 performs various types of processing, such as editing, on image data input from the scanner 320. The printer image processing unit 314 performs processing on image data to be output by printing, such as correction according to the printer engine, resolution conversion, and so forth. The image edit processing unit 315 performs various types of image processing, such as rotating image data, compression/decompression processing of image data, and so forth.

A switch 317 is for receiving shutdown and power supply activation operations by the user. Upon the switch 317 having been operated, an interrupt signal is delivered from a power supply control unit 316 to the CPU 302. Upon detecting the interrupt signal, the CPU 302 controls the power supply control unit 316 in accordance with the current state.

The printing apparatus 102 has multiple sheet holding units 322. The following description will be made assuming that the sheet holding units 322 are sheet feeding trays, but may be manual feeding trays instead. Note that the configuration of multiple sheet holding units may include both sheet feeding trays and manual feeding trays.

Figure 4A:
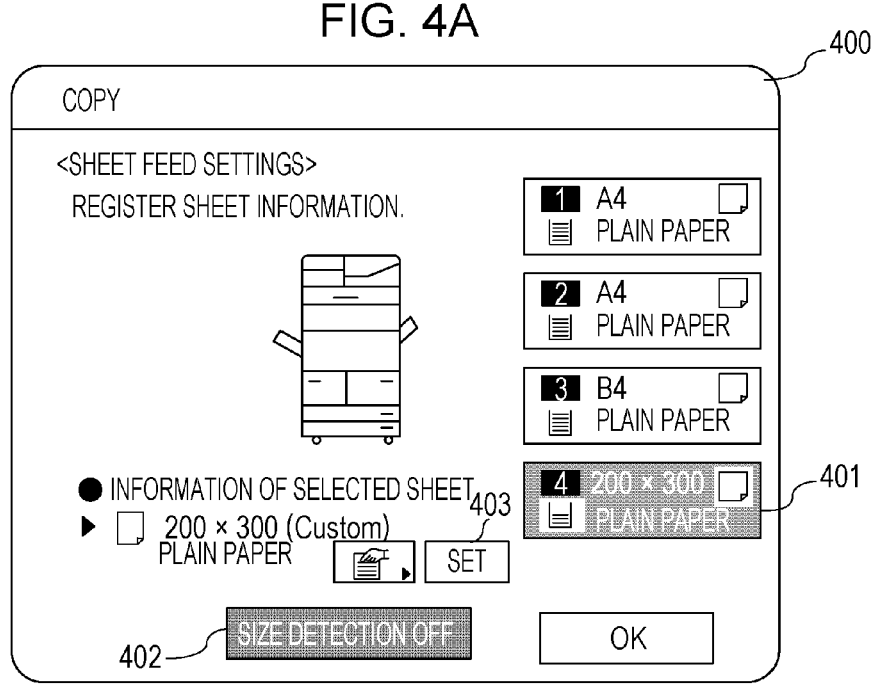
FIGS. 4A and 4B are diagrams illustrating examples of setting screens displayed on an operation unit of the printing apparatus according to the first embodiment.

Each sheet holding unit 322 includes a size detection sensor 325 to detect the size of the sheets stored in the sheet holding unit 322, an open/close detection sensor 326 to detect opening/closing operations of the sheet holding unit 322, and so forth. Alternatively, the size of the sheets stored in the sheet holding unit 322 may be obtained by accepting user operations on the operation unit 318 of the printing apparatus 102 by way of a setting screen 400 such as illustrated in FIG. 4A. The user can also register sheet attributes of sheets held in each sheet holding units 322 as setting values for each sheet holding units 322, by using the setting screen 400 in FIG. 4A. The size of sheets held in the sheet holding units 322 may also be imported from an external device, such as the information processing apparatus 104. Moreover, the sheet holding units 322 can hold non-standard size sheets in addition to standard size sheets.

Now, a standard size is a size of which the sheet height and width has been stipulated by a standard, such as exemplarily listed in a standard size table 500 in FIG. 5. The standard size table 500 is stored in the HDD unit 205 of the server 101 or the HDD 308 of the printing apparatus 102. For example, the standard size "A4" has a sheet width of 210 mm and height of 297 mm. Also for example, the standard size "LTR" has a sheet width of 215.9 mm and height of 297.4 mm. On the other hand, a non-standard size is a size which does not conform to any sheet size (weight and height) stipulated as a standard size. For example, a sheet which has a width of 200 mm and a height of 300 mm does not conform to any sheet size (weight and height) stipulated as a standard size, and thus is a non-standard size.

When a standard size sheet is stored in a sheet holding unit 322, the size detection sensor 325 detects that the sheet stored in the sheet holding unit 322 is of a standard size. An arrangement capable of accurately detecting the width and height of sheets stored in the sheet holding units 322 including non-standard size sheets as well would necessitate increased sensor accuracy, which would increase costs.

Accordingly, in a case where a sheet is stored in the sheet holding units 322, the size detection sensor 325 according to the present embodiment detects the size of a sheet stored in the sheet holding unit 322 as being a standard size. The reason is that the size detection sensor 325 detects the position of standard size guides when detecting the size of sheets held by the sheet holding units 322.

A condition for a sheet to be detected as a particular standard size by the size detection sensor 325 is for the size of the sheet held by the sheet holding unit 322 is for the width to be within a difference of ±X mm as to a standard size, and for the height to be within a difference of ±Y mm. The values of X and Y may be inherent values, or may be optionally settable by the user by way of an unshown setting screen. Description will be made here assuming that X=20 and Y=20. For example, in a case where a non-standard size sheet having a width of 200 mm and a height of 300 mm is stored in the sheet holding unit 322, the size detection sensor 325 detects the size of this sheet as being the standard size "LTR" when the sheet holding unit 322 is closed. Although the actual sheet size is 200 mm in width of 300 mm in height, the size detection sensor 325 detects the sheet as being the standard size "LTR" which has a sheet width of 215.9 mm and height of 297.4 mm.

Figure 4B:
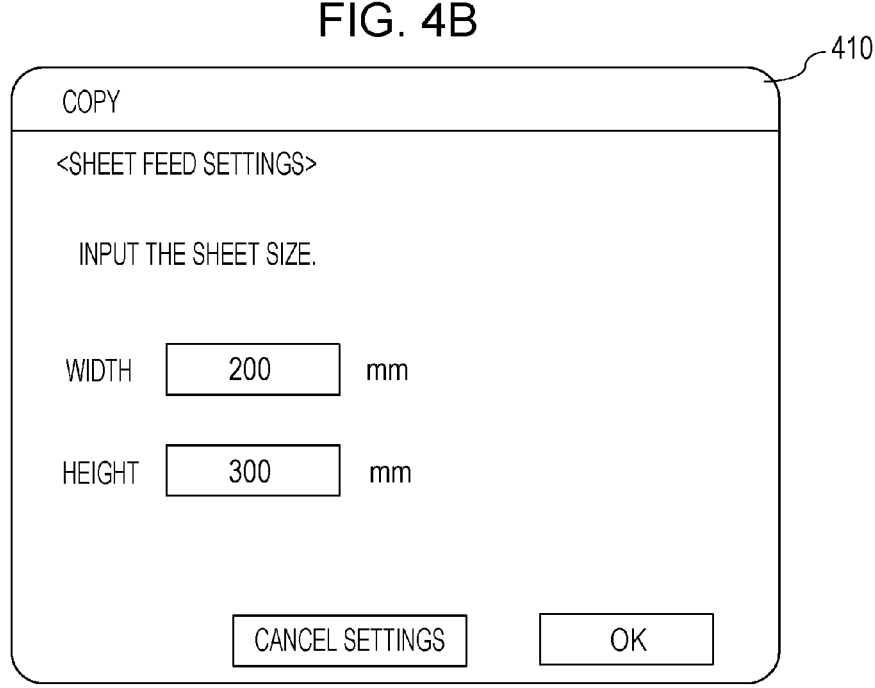

On the other hand, in a case of registering the actual size of a sheet stored in the sheet holding unit 322 as the setting value of that sheet holding unit 322, instead of the size detected as the standard size (such as LTR), the user first presses a set button 403 in the setting screen 400 illustrated in FIG. 4A. This brings up a setting screen 410 on the operation unit 318 as illustrated in FIG. 4B. The user can register the actual size of the sheet as the setting value of the sheet holding unit 322 by inputting the actual width and height (e.g., 200 mm in width of 300 mm in height) of the sheet using the setting screen 410 in FIG. 4B.

Note that in a case where the user has input the actual size of the sheet using the setting screen 410 and the input size has been registered as the setting values of the sheet holding unit 322, control is effected such that the size detected by the size detection sensor 325 is not used to overwrite the setting values of the sheet holding unit 322. This is to prevent a standard size automatically detected by the size detection sensor 325 being overwritten over the non-standard size registered by the user as the setting values of the sheet holding unit 322 each time the sheet holding unit 322 is opened and closed to replenish sheets or the like, for example. That is to say, a mode is set to where the size of sheets held in the sheet holding unit 322 are not automatically detected by the size detection sensor 325 (detection OFF) in a case where he user inputs a non-standard size sheet using the setting screen 410 and this size is registered as the setting values of the sheet holding unit 322. Note that in a case where the width and height of the sheet is registered as the setting values of the sheet holding unit 322 from the operation unit 318, control may be effected so that instead of not detecting by the size detection sensor 325, the detected size is not registered by the CPU 302 as the setting values of the sheet holding unit 322.

While description has been made regarding a case where a non-standard size is input from the setting screen 400 (or setting screen 410), where control is effected such that the sheet size detected by the size detection sensor 325 is not overwrite-registered as the setting value of the sheet holding unit 322, this is not restrictive. The same sort of control is applied for cases where attribute information such as size and so forth of a sheet where parameters such as grammage and so forth of a standard sheet or a sheet which the printer manufacturer has already evaluated have been customized (hereinafter referred to as "user-defined sheet") has been input from the setting screen 400 (or setting screen 410), as well.

Note that a mode to automatically detect the size of sheets held in the sheet holding unit 322 (detection ON) and mode to automatically not detect the size of sheets held in the sheet holding unit 322 (detection OFF) may be user-selectable by a switch separately provided. Note that in a case where non-standard size sheets in a sheet holding unit 322 are replaced with standard size sheets when in the mode where the size detection sensor 325 does not automatically detect the size of sheets in the sheet holding unit 322, the sheet size is not automatically detected. To switch from the mode where the size detection sensor 325 does not automatically detect the size of sheets in the sheet holding unit 322 (detection OFF) to the mode where detection is automatically performed (detection ON), the user can press a size detection button 402 on the setting screen 400 illustrated in FIG. 4A. Upon pressing the size detection button 402, the size detection sensor 325 detects the size of the sheet held in the sheet holding unit 322 as a standard size, and the detected standard size can be set as the setting values of the sheet holding unit 322.

In addition to the size detection sensor 325, each sheet holding unit 322 may further be provided with a sensor to detect the remaining amount of sheets held in the sheet holding unit 322, and sensor to detect the color of the sheets and surface nature and so forth of the sheets held in the sheet holding unit 322. In the same way, the color of the sheets and surface nature and so forth of the sheets held in the sheet holding unit 322 may be obtained by user input from the setting screen 400 to be registered as setting values for the sheet holding unit 322 or alternatively may be imported from an external apparatus such as the information processing apparatus 104 or the like.

A sheet holding unit control unit 321 is a module which saves sheet attribute information as setting values in the sheet holding units 322 of the printing apparatus 102 and controls feeding of the sheets. The printing apparatus 102 controls printing based on the sheet attribute information saved as the setting values of the sheet holding units 322. Examples of sheet attribute information include the size of the sheet, the grammage of the sheet, the color of the sheet, the type of the sheet, and so on. This information is used for printing by the printing apparatus 102.

For example, the printing apparatus 102 decides which sheet holding unit 322 from which sheets should be fed, based on the sheet size to be used in a print job, and controls so as to feed sheets from the sheet holding unit 322 that has been decided upon. The printing apparatus 102 also controls the temperature of the fixing unit and the sheet conveyance speed based on the grammage of the sheet. The temperature of the fixing unit and the sheet conveyance speed may be controlled based on the sheet type as well. The sheet holding unit control unit 321 obtains information relating to opening/closing action of the sheet holding units 322 from the open/close detection sensor 326, to detect whether or not a sheet holding unit 322 which was open has been closed.

Such sheet attribute information is registered by the user, and held in the sheet management table 600 illustrated in FIG. 6, in a list format. The sheet management table 600 is held in the HDD unit 205 of the server 101 as a storage area. The sheet management table 600 holds, for example, an ID, the name of the sheet, the size of the sheet, the grammage of the sheet, the type of the sheet, the color of the sheet, and so on. Sheets which are to be registered in the sheet management table 600 include sheets that are normally used, and also user-defined sheets. Non-standard size sheets can be registered in the sheet management table 600 besides standard size sheets. Note that the sheet management table 600 may be realized as a storage region in the HDD 308 of the printing apparatus 102 instead of the HDD unit 205 of the server 101, or in unshown nonvolatile memory in the image processing apparatus 104. In such a case, data stored in the sheet management table 600 can be referenced over the network 103.

Figure 7:
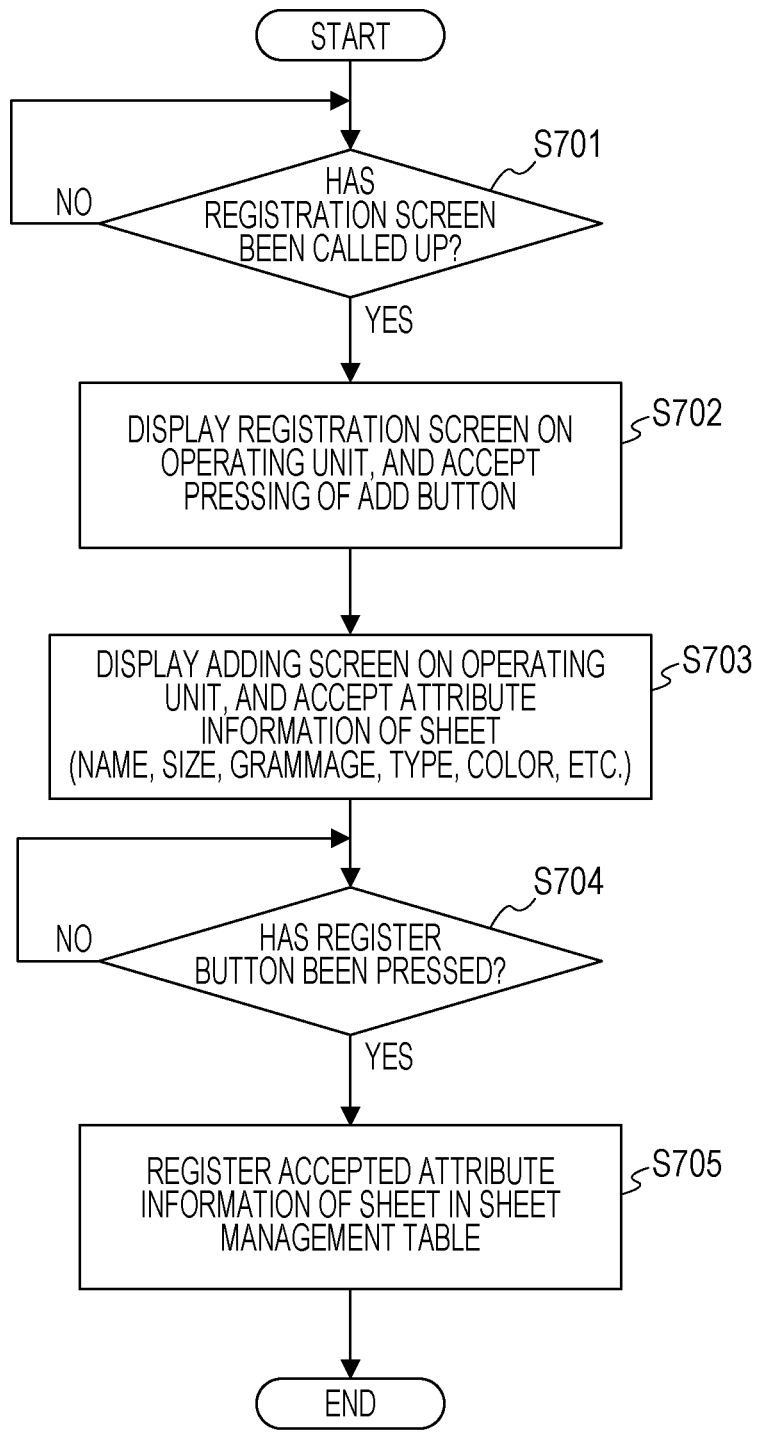
FIG. 7 is a flowchart for describing processing of registering sheet attribute information in a sheet management table in the server according to the first embodiment.

Next, processing to register the sheet attribute information in the sheet management table 600 will be described with reference to the flowchart illustrated in FIG. 7. Note that the processing in FIGS. 7 and 10 is executed by the server 101. This processing is carried out by the CPU 207 of the server 101 reading out a program from the HDD unit 205, loading the program to the second memory unit 208, and executing the program. While a case will be described in the embodiment according to the present invention where the processing in FIGS. 7 and 10 is executed by the server 101, this processing may be executed by the printing apparatus 102, in which case this processing is carried out by the CPU 302 of the printing apparatus 102 reading out the program from the HDD 308, loading the program to the RAM 303, and executing the program. In an arrangement where the image processing apparatus 104 serves as the server 101, the image processing apparatus 104 may execute this processing.

In S701, the CPU 207 determines whether or not a registration screen 800 illustrated in FIG. 8A has been called up at the operation unit 209 of the server 101. The registration screen 800 in FIG. 8A is a screen used to additionally register sheet attribute information to the sheet management table 600, and to delete sheet attribute information registered in the sheet management table 600. Examples of sheet attribute information include ID, the name of the sheet, the size of the sheet, the grammage of the sheet, the type of the sheet, the color of the sheet, and so on. These are registered in list format using the registration screen 800.

In a case where the result of the determination in S701 is that the CPU 207 determines the registration screen 800 to have been called up, the flow advances to S702. Otherwise, the CPU 207 repeats the processing of S701 until determining that the registration screen 800 has been called up.

In S702, the CPU 207 displays the registration screen 800 on the operation unit 209 of the server 101, and upon an add button 801 on the registration screen 800 being pressed, advances to S703.

In S703, the CPU 207 displays an addition screen 810 such as illustrated in FIG. 8B on the operation unit 209 of the server 101. The user can additionally set sheet attribute information to be registered to the sheet management table 600 using the addition screen 810 in FIG. 8B. Upon having accepted sheet attribute information set by the user (e.g., sheet name, size, grammage, type, color, etc.) at the addition screen 810, the flow advances to S704. Attribute information such as sheet name, size, grammage, type, color, etc., are not restricted to user input. Such attribute information may be imported from an external device such as the image processing apparatus 104 or the printing apparatus 102.

In S704, the CPU 207 determines whether or not a register button 811 in the addition screen 810 in FIG. 8B has been pressed. In a case of the CPU 207 having determined that the register button 811 has been pressed, the flow advances to S705. Otherwise, the CPU 207 repeats the processing of S704 until determining that register button 811 has been pressed.

In S705, the CPU 207 registers the sheet attribute information accepted in S703 to the sheet management table 600 held in the HDD unit 205 of the server 101. After the processing of S705, the series of processing to register the sheet attribute information in the sheet management table 600 ends.

The details of the series of processing to register the sheet attribute information in the sheet management table 600 have been described so far. In a case that this processing is to be executed at the printing apparatus 102, the processing described above regarding execution at the server 101 can be applied thereto, by respectively reading the "CPU 207", "operation unit 209", and "HDD unit 205" of the server 101 as "CPU 302", "operation unit 318", and HDD 308" of the printing apparatus 102 instead.

In a case where settings have been made to automatically detect the size of a sheet held in a sheet holding unit 322 by a sensor, sheets stored in the sheet management table 600 beforehand which match the detected sheet size are displayed as candidates. The user selects the desired sheet attribute information from the candidates, and can register this as the attribute information of the sheet held in the sheet holding unit 322. On the other hand, in a case where settings have been made not to automatically detect the size of a sheet held in a sheet holding unit 322 by a sensor, attribute information of the sheet held in the sheet holding unit 322 has not been able to be easily registered with the related art using the sheet attribute information stored in the sheet management table 600 beforehand.

To this end, the printing system according to the first embodiment includes the printing apparatus 102 and the server 101 communicable with the printing apparatus 102. The user first stores the sheet attribute information (size, grammage, type, color, etc.) in the server 101 beforehand. In a case where settings have been made regarding a sheet holding unit 322 of the printing apparatus 102 not to automatically detect the size of the sheet held in the sheet holding unit 322 by a sensor, the server 101 sends an instruction to the printing apparatus 102 to automatically detect the size of the sheet held in the sheet holding unit 322 by the sensor. Accordingly, even in a case where settings have been made not to automatically detect the size of the sheet held in the sheet holding unit 322 by a sensor, sheet attribute information stored beforehand can easily be registered as the attribute information of the sheet held in the sheet holding unit 322.

The following description of operations of the configuration according to the first embodiment will be made assuming that the sheet management table 600 in FIG. 6 has already been registered in the HDD unit 205 of the server 101.

Figure 9A:
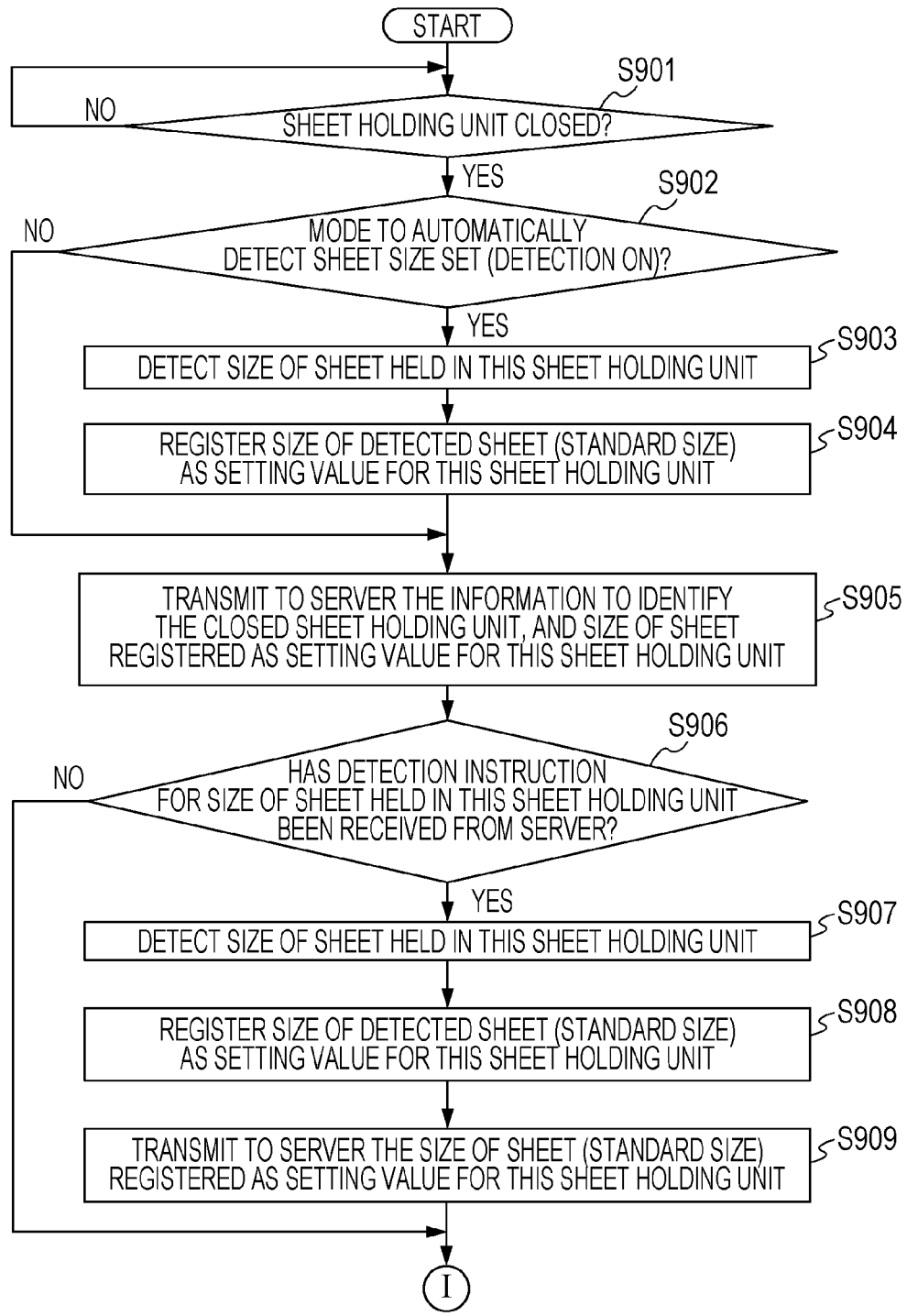
FIGS. 9A and 9B are a flowchart for describing processing of registering sheet attribute information as setting values of a sheet holding unit in the printing apparatus according to the first embodiment.
Figure 9B:
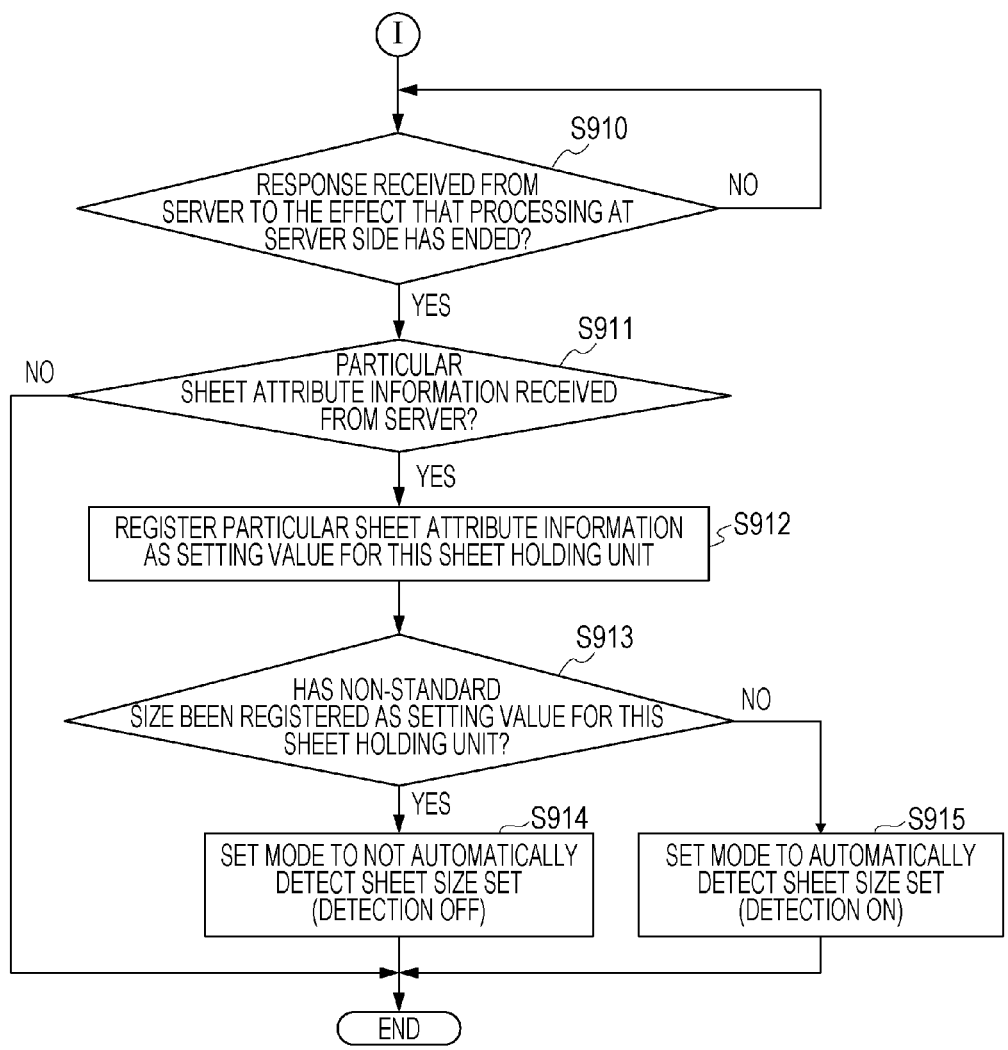

The series of processing to register the sheet attribute information in the printing apparatus 102 according to the first embodiment as setting values of the sheet holding unit 322 will be described with reference to the flowchart in FIGS. 9A and 9B. This processing is carried out by the CPU 302 of the printing apparatus 102 reading out a program from the HDD 308, loading the program to the RAM 303, and executing the program. This processing is started in a case where the printing apparatus 102 and the server 101 are communicable via the network 105 such as a LAN or the like.

In S901, the CPU 302 determines whether or not a sheet holding unit 322 has been closed. The user opens a sheet holding unit 322 to store sheets therein, stores the sheets in the sheet holding unit 322, and then closes the sheet holding unit 322. Closing of the sheet holding unit 322 can be determined by a signal obtained from the open/close detection sensor 326 illustrated in FIG. 3 or the like. In a case where the result of the determination in S901 is that the CPU 302 determines the sheet holding unit 322 to have been closed, the flow advances to S902. Otherwise, the CPU 302 repeats the processing of S901 until determining that the sheet holding unit 322 has been closed.

In S902, the CPU 302 determines whether or not the sheet holding unit 322, regarding which determination has been made in S901 of having been closed, is in the mode for automatically detecting the size of the sheet held in the sheet holding unit 322 (detection ON). In a case where the CPU 302 determines that the sheet holding unit 322 is in the mode for automatically detecting the size of the sheet (detection ON), the flow advances to S903. On the other hand, in a case where the CPU 302 makes a negative determination in S902, that is to say, a mode is set to where the size of sheets held in the sheet holding unit 322 are not automatically detected by the size detection sensor 325 (detection OFF), the user of the printing apparatus 102 is prompted and inputs a non-standard size sheet using the setting screen 410, the input size is registered as the setting values of the sheet holding unit 322, and the flow advances to S905.

In S903, the CPU 302 detects the size of the sheet held in the sheet holding unit 322 using the size detection sensor 325, and advances to S904. The size detection sensor 325 detects the size of the sheet stored in the sheet holding unit 322 as a standard size.

In S904, the CPU 302 registers the sheet size detected in S903 (standard size) as the setting values for this sheet holding unit 322, and the flow advances to S905.

In S905, the CPU 302 sends information for identifying the sheet holding unit 322 that was closed (e.g., sheet holding unit No.) and the sheet size registered as the setting values for the sheet holding unit 322 to the server 101 via the network 105, and the flow advances to S906. Note that the sheet size which the printing apparatus 102 sends in S905 is either a standard size or a non-standard size. In the case of a standard size, information such as "A4" or "A3" is sent as the sheet size, for example. In the case of a non-standard size, information such as "width 200 mm, height 300 mm" is sent, for example. The sheet size (standard size) sent by the printing apparatus 102 is necessary information to decide sheet candidates from the sheets registered in the sheet management table 600, based on this standard size. Note that the information which the printing apparatus 102 sends in S905 is received by the server 101 in S1001 in FIG. 10 which will be described later.

In S906, the CPU 302 determines whether or not an instruction to detect the size of the sheet held in this sheet holding unit 322 has been received from the server 101. The information which the printing apparatus 102 receives in S906 is sent by the server 101 in S1003 in FIG. 10 which will be described later. In a case where the CPU 302 determines in S906 that an instruction to detect the sheet size has been received, the flow advances to S907. On the other hand, in a case where the CPU 302 makes a negative determination in S906, the flow advances to S910.

Figure 11:
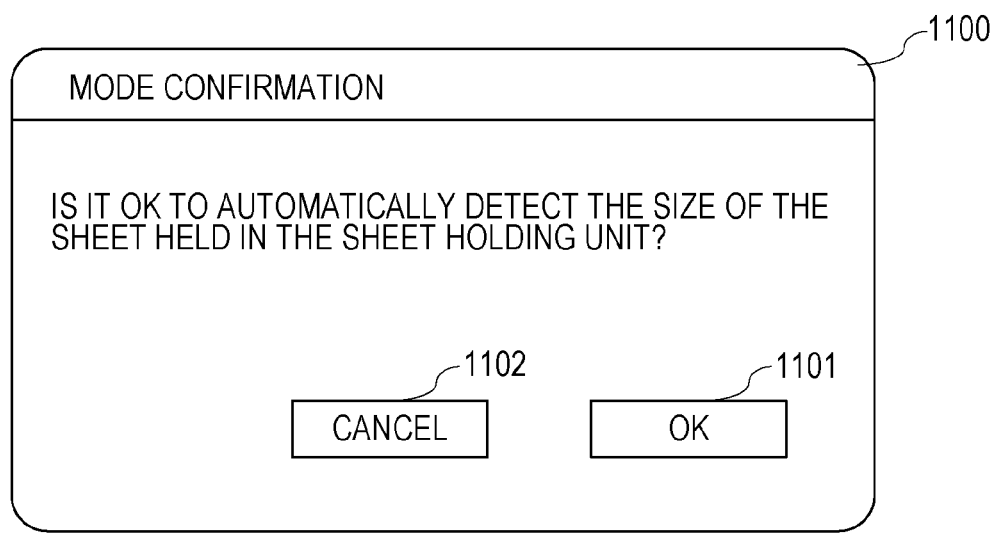
FIG. 11 is a diagram illustrating an example of a confirmation window displayed on the operation unit in the printing apparatus according to the first embodiment.

In a case where an instruction to detect the size of the sheet held in the sheet holding unit 322 has been determined in S906 to have been received from the server 101, the CPU 302 may display a confirmation window 1100 illustrated in FIG. 11 on the operation unit 318. The CPU 302 may then prompt the user to give an instruction to automatically detect the size of the sheet held in the sheet holding unit 322 by the size detection sensor 325. Alternatively, the user may be given a selection regarding whether or not to automatically detect the size of the sheet held in the sheet holding unit 322 by the size detection sensor 325. In a case where the user has pressed an OK button 1101 on the confirmation window 1100 in FIG. 11, the flow advances to S907. On the other hand, in a case where the user has pressed a cancel button 1102 on the confirmation window 1100, the series of processes to register the sheet attribute information as the setting values of the sheet holding unit 322 (FIGS. 9A and 9B) ends. An arrangement may be made wherein, in a case where a predetermined amount of time elapses after the confirmation window 1100 has been displayed on the operation unit 318 without any operation made to either of the OK button 1101 and cancel button 1102 by the user, the series of processes in FIGS. 9A and 9B ends. The predetermined amount of time for timeout may be optionally set by the user.

In S907, the CPU 302 detects the size of the sheet held in the sheet holding unit 322 by the size detection sensor 325, and advances to S908. Note that the size detection sensor 325 detects the size of the sheet held in the sheet holding unit 322 as a standard size.

In S908, the CPU 302 registers the sheet size detected in S907 (standard size) as the setting values of this sheet holding unit 322, and the flow advances to S909.

In S909, the CPU 302 sends the sheet size (standard size) registered as the setting values of this sheet holding unit 322 to the server 101 via the network 105, and the flow advances to S910. The sheet size (standard size) sent by the printing apparatus 102 is necessary information to decide sheet candidates from the sheets registered in the sheet management table 600, based on this standard size. Note that the information which the printing apparatus 102 sends in S909 is received by the server 101 in S1004 in FIG. 10 which will be described later.

In S910 the CPU 302 determines whether or not a response to the effect that processing at the server 101 has ended, has been received from the server 101 via the network 105. In a case of the CPU 302 having determined that the response has been received, the flow advances to S911. Otherwise, the CPU 302 repeats the processing of S910 until determining that the response has been received. Note that the information which the printing apparatus 102 receives in S910 is sent by the server 101 in S1009 in FIG. 10 which will be described later.

Note that an arrangement may be made where the flow times out if the response from the server 101 is not received within a predetermined amount of time, and the series of processes for registering the sheet attribute information as setting values for the sheet holding unit 322 (FIGS. 9A and 9B) ends. At this time, the user may be notified to this effect by displaying an unshown warning screen on the operation unit 318 of the printing apparatus 102 to the effect that a timeout has occurred. The predetermined amount of time for timeout may be optionally set by the user. Further, an arrangement may be made where, in a case of timing out, the setting screen 400 illustrated in FIG. 4A is displayed on the operation unit 318 and user operations are accepted, thereby registering the attribute information of the sheet held in the sheet holding unit 322 as the setting values for this sheet holding unit 322. Alternatively, an arrangement may be made where, in a case of timing out, the setting values of the sheet holding unit 322 registered in S908 are restored to the previous setting values (before S907).

In S911, the CPU 302 determines whether or not particular sheet attribute information to be registered as setting values of this sheet holding unit 322 has been received from the server 101 via the network 105. In a case of the CPU 302 determining that the particular sheet attribute information has been received, the flow advances to S912.

On the other hand, in a case of the CPU 302 making a negative determination in S911, the series of processes for registering the sheet attribute information as setting values for the sheet holding unit 322 (FIGS. 9A and 9B) ends. Examples of conceivable cases of the CPU 302 making a negative determination in S911 include not only a case of accepting a timeout instruction at the server 101 side, and a case of accepting a cancel instruction at the server 101 side, but also a case where there is not even one sheet candidate to register as setting values for the sheet holding unit 322. Note that the information which the printing apparatus 102 receives in S911 is sent by the server 101 in S1008 in FIG. 10 which will be described later.

In S912, the CPU 302 registers the particular sheet attribute information received from the server 101 in S911 (size, grammage, type, color, etc.) as setting values of this sheet holding unit 322, and the flow advances to S913. The sheet attribute information registered as setting values of this sheet holding unit 322 in S912 are temporarily saved on the HDD 308 as setting values of this sheet holding unit 322. Upon the user finalizing the setting values of this sheet holding unit 322 using the operation unit 318 of the printing apparatus 102, the setting values of this sheet holding unit 322 are finalized and held in the HDD 308.

In S913, the CPU 302 determines whether a non-standard size has been registered as the setting values for this sheet holding unit 322. In a case where the CPU 302 determines that a non-standard size has been registered, the flow advances to S914.

In S914, the CPU 302 sets the mode to the mode where the size detection sensor 325 does not automatically detect the size of the sheet held in the sheet holding unit 322 (detection OFF). The reason is to prevent a standard size automatically detected by the size detection sensor 325 being overwritten over the non-standard size which has been set as the setting values for this sheet holding unit 322 when the sheet holding unit 322 is opened and closed to replenish sheets, for example. After the processing of S914, the series of processes to register the sheet attribute information as the setting values of the sheet holding unit 322 (FIGS. 9A and 9B) ends.

On the other hand, in a case of a negative determination in S913 by the CPU 302, the flow advances to S915. In S915, the CPU 302 sets the mode to the mode where the size detection sensor 325 automatically detects the size of the sheet held in the sheet holding unit 322 (detection ON). After the processing of S915, the series of processes of FIGS. 9A and 9B ends.

The details of the series of processing to register sheet attribute information as setting values for a sheet holding unit 322 in the printing apparatus according to the first embodiment, in a case where the printing apparatus 102 and server 101 are communicable via a network 105 such as a LAN or the like, have been described so far.

Note that there are cases where the printing apparatus 102 and server 101 are not communicable via a network 105, due to a reason such as the power of the server 101 being off or the like. Accordingly, whether or not the printing apparatus 102 and server 101 are communicable via the network 105 is determined beforehand, before starting the series of processing in FIG. 9A. In a case where determination is made that communication is not available, the mode may be set to the mode where the size detection sensor 325 does not automatically detect the size of the sheet held in the sheet holding unit 322 (detection OFF).

Next, a series of processing for deciding a particular sheet from sheets registered in the sheet management table 600 at the server 101 according to the first embodiment will be described with reference to the flowchart in FIG. 10.

In S1001, the CPU 207 determines whether or not there has been received, from the printing apparatus 102 via the network 105, information for identifying the sheet holding unit 322 that was closed (e.g., sheet holding unit No.) and the sheet size registered as the setting values for the sheet holding unit 322. Note that the sheet size which the server 101 receives in S1001 is either a standard size or a non-standard size. In the case of a standard size, information such as "A4" or "A3" is received as the sheet size, for example. In the case of a non-standard size, information such as "width 200 mm, height 300 mm" is received as the sheet size, for example. In a case where the CPU 207 determines in S1001 that these have been received, the flow advances to S1002. Otherwise, the CPU 207 repeats the processing of S1001 until determination is made that these have been received. Note that the information received at the server 101 in S1001 has been sent by the printing apparatus 102 in S905 in FIG. 9A described above.

In S1002, the CPU 207 references the standard size table 500 stored in the HDD unit 205, and determines whether or not the size of the sheet received in S1001 is a standard size. In a case of the CPU 207 determining that this is a standard size, the flow advances to S1005. On the other hand, in a case where the CPU 207 makes a negative determination in S1002, the flow advances to S1003.

In S1003, the CPU 207 sends an instruction, to automatically detect the size of the sheet held in this sheet holding unit 322 by the size detection sensor 325, to the printing apparatus 102 via the network 105, and the flow advances to S1004. Note that the information sent by the server 101 in S1003 is received by the printing apparatus 102 in S906 in FIG. 9A described earlier. Causing automatically detection of the size of the sheet held in the sheet holding unit 322 by this instruction enables sheets matching the size of the sheet automatically detected to be identified as candidates out of the sheets stored in the sheet management table 600 in FIG. 6 beforehand.

In S1004, the CPU 207 determines whether or not a sheet size (standard size) set as setting values for this sheet holding unit 322 has been received from the printing apparatus 102. In a case where the CPU 207 determines that this sheet size has been received, the flow advances to S1005. Otherwise, the CPU 207 repeats the processing of S1004 until determining that this sheet size has been received. The information which the server 101 receives in S1004 is sent by the printing apparatus 102 in S909 in FIG. 9A described earlier.

In S1005, the CPU 207 searches for corresponding sheet candidates from the sheets registered in the sheet management table 600, based on the sheet size (standard size) received in S1002 or S1004. Of the sheets registered in the sheet management table 600, sheets of a size matching the sheet size (standard size) received in S1002 or S1004, and sheets of a size close to this standard size, are searched as candidates, for example, in S1005.

Note that the phrase "sheets of a size close to this standard size" means sheets of which the difference in size as to the standard size is within a predetermined range. More specifically, this means sheets of a size where the width is within a difference of ±X mm and for the height is within a difference of ±Y mm as to the width and height of the standard size. The values of X and Y may be inherent values, or may be optionally settable by the user by way of an unshown setting screen. Description will be made here assuming that X=20 and Y=20. For example, the standard size "LTR" has a sheet width of 215.9 mm and height of 279.4 mm, as illustrated in the standard size table 500 in FIG. 5. Accordingly, sheets of a size close to the standard size "LTR" are sheets which fall within the range of having a width of 215.9 mm ±20 mm and a height of 279.4 mm ±20 mm.

Figure 12:
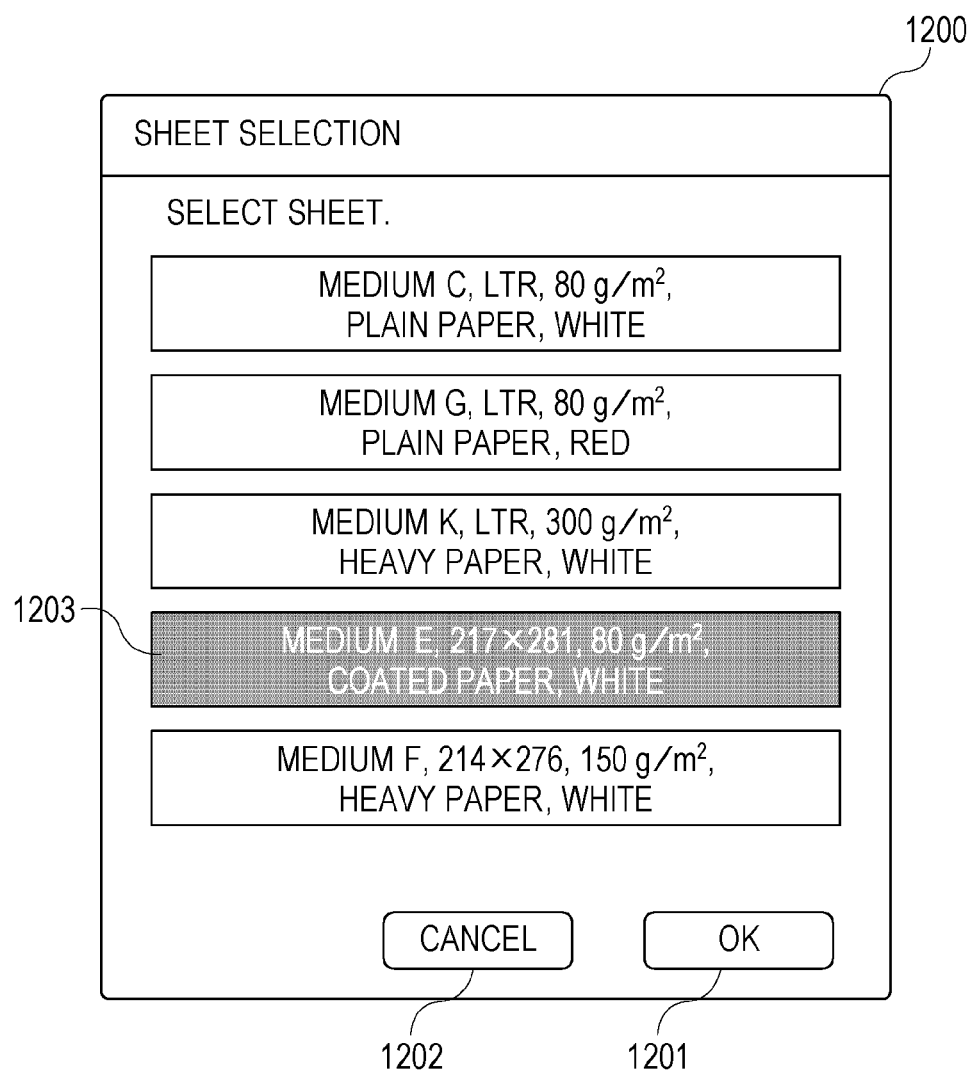
FIG. 12 is a diagram illustrating an example of a selection screen displayed on the operation unit in the server according to the first embodiment.

In S1006, the CPU 207 displays the sheet candidates (sheets of a size matching this standard size and sheets of a size close to this standard size) as the results of the search in S1005 on a selection screen 1200 illustrated in FIG. 12, and the flow advances to S1007. Note that the selection screen 1200 in FIG. 12 is displayed on the operation unit 209 of the server 101. In the example of the selection screen 1200 in FIG. 12, medium C, medium G, and medium K are candidates of sheets matching the standard size "LTR", as the result of the search in S1005. On the other hand, media E (width of 217 mm and height of 281 mm) and media F (width of 214 mm and height of 276 mm) are candidates of sheets close to the size of the standard size "LTR".

While an arrangement has been described in which sheets of a size matching this standard size and sheets of a size close to this standard size are displayed on the selection screen 1200 as candidates, this is not restrictive. An arrangement may be made where only sheets of a size matching the standard size are displayed on the selection screen 1200, or where only sheets of a size close to the standard size are displayed on the selection screen 1200, as candidates. Alternatively, sheets of a size matching the standard size and sheets of a size close to the standard size may be displayed on the selection screen 1200 so as to be distinguishable from each other.

In S1007, the CPU 207 determines whether or not the user has decided a particular sheet from the sheet candidates (sheets of a size matching this standard size and sheets of a size close to this standard size) displayed on the selection screen 1200. In a case where the CPU 207 determines that the user has decided on a particular sheet from these candidates, the flow advances to S1008. In a case where the CPU 207 makes a negative determination in S1007, the flow advances to S1009. When the user selects one particular sheet from the selection screen 1200, the selected sheet is highlighted, as indicated by reference numeral 1203 in FIG. 12. If the user presses an OK button 1201 in the selection screen 1200 in a state where a sheet is highlighted, this particular sheet is decided upon.

Cases of a negative determination by the CPU 207 in S1007 include a case where the user presses the a cancel button 1202 in the selection screen 1200, or a case where a predetermined amount of time has elapsed from the sheet candidates being displayed in the selection screen 1200 in S1006 with neither the OK button 1201 nor the cancel button 1202 having been pressed. The predetermined amount of time for timeout may be optionally set by the user.

In S1008, the CPU 207 sends the particular sheet attribute information decided by the user in S1007 to the printing apparatus 102 via the network 105, and the flow advances to S1009. For example, in a case where the user has decided on medium E as the particular sheet, the attribute information of the medium E (size of 217 mm wide and 281 mm high, grammage of 80 g/m$^2$, the type being coated paper and the color being white) is sent to the printing apparatus 102. Note that the information which the server 101 sends in S1008 is received by the printing apparatus 102 in S911 in FIG. 9B described earlier.

In S1009, the CPU 207 sends a response to the printing apparatus 102 via the network 105 to the effect that processing at the server 101 side has ended. Note that the information which the server 101 sends in S1009 is received by the printing apparatus 102 in S910 in FIG. 9B described earlier. The series of processes in FIG. 10 thus ends.

The details of the series of processing in FIG. 10 performed at the server 101 according to the first embodiment to decide a particular sheet from the sheets registered in the sheet management table 600 held in the HDD unit 205 of the server 101, have been described so far. In a case that this processing is to be executed at the printing apparatus 102, the processing described above regarding execution at the server 101 can be applied thereto, by respectively reading the "CPU 207" and "HDD unit 205" of the server 101 as "CPU 302" and HDD 308" of the printing apparatus 102 instead.

Although an arrangement has been described where the selection screen 1200 in FIG. 12 is displayed on the operation unit 209 of the server 101, this is not restrictive. Sheet candidates for registration of setting values of the sheet holding unit 322 may be sent to the printing apparatus 102, and one particular sheet may be decided from these candidates at the printing apparatus 102 side.

In a case where the result of the search in S1005 yields only one candidate to be registered as the setting values of the sheet holding unit 322, the flow may advance directly to S1008 after the processing in S1005, without displaying the candidate on the selection screen 1200 in FIG. 12 in S1006. Also, in a case where the result of the search in S1005 yields no candidates at all to be registered as the setting values of the sheet holding unit 322, the flow may advance directly to S1009 after the processing in S1005 without displaying the candidates on the selection screen 1200 in S1006.

Now, in a case where a sheet holding unit 322 used in a job currently being executed has been opened/closed, it is likely that the sheet holding unit 322 has been opened/closed to replenish sheets, so sheet attribute information set as the setting values of the sheet holding unit 322 does not have to be changed. Accordingly, an arrangement may be made where, for example, determination is made after the processing in S901 in FIG. 9A regarding whether or not the sheet holding unit 322 that has been closed is the sheet holding unit 322 used in the job currently being executed, and if this is the case, the series of processes in FIGS. 9A and 9B is ended without advancing to the processing in S902.

Figure 13:
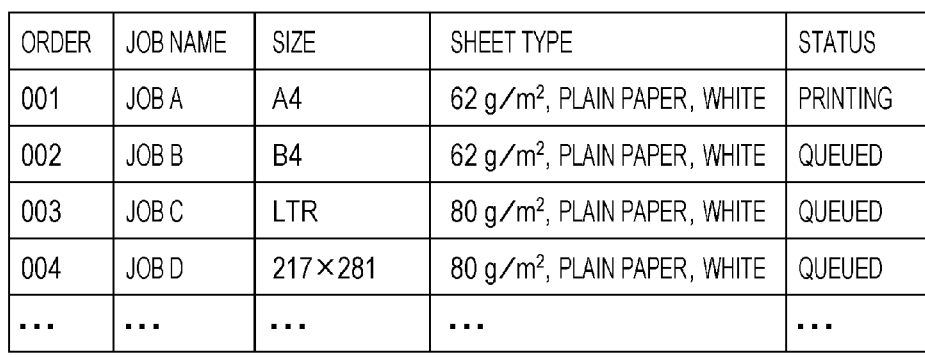
FIG. 13 is a diagram illustrating an example of a sheet management table stored in a hard disk drive unit in the printing apparatus according to the first embodiment.
Figure 14:
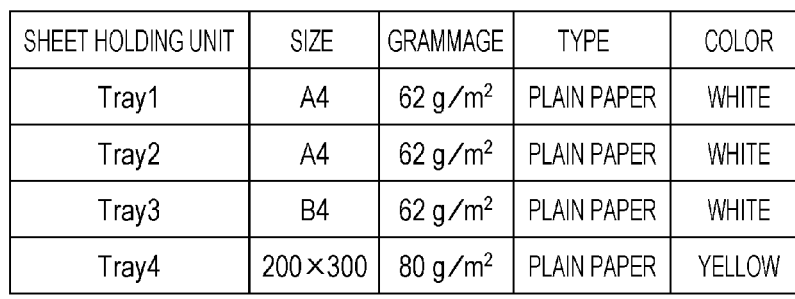
FIG. 14 is a diagram illustrating an example of the sheet management table stored in the hard disk drive unit in the printing apparatus according to the first embodiment.

An example will be described where there are, as jobs regarding which execution instructions have been accepted, a job that is being printed (job A) and queued jobs (jobs B, C, and D), registered in a job management table 1300 in FIG. 13 stored in the HDD 308. In a sheet feed setting table 1400 illustrated in FIG. 14, stored in the HDD 308, sheet attribute information "A4, plain paper" is registered for a Tray 1 which is a sheet holding unit 322, and sheet attribute information "B4, plain paper" is registered for a Tray 3, for example.

The job A currently being printed uses the sheet "A4, plain paper", so the sheet feed setting table 1400 is referenced, and the Tray 1 is used for the job A, for example. That is to say, the Tray 1 is the sheet holding unit 322 being used for the job currently being executed, so the CPU 302 ends the series of processes in FIGS. 9A and 9B without advancing to the processing of S902 and thereafter. The job B currently queued uses the sheet "B4, plain paper", so the sheet feed setting table 1400 is referenced, and the Tray 3 is used for the job B. That is to say, the Tray 3 is not the sheet holding unit 322 being used for the job currently being executed, so the CPU 302 advances the flow to the processing of S902 in FIG. 9A and thereafter.

Now, there may be cases where the setting values of a sheet holding unit 322 have been changed by accepting user operations at the setting screen 400 in FIG. 4A displayed on the operation unit 318, before this sheet holding unit 322 is closed. In such a case where the setting values of the sheet holding unit 322 has been manually changed according to user intent, the series of processes in FIGS. 9A and 9B does not have to be executed. Accordingly, an arrangement may be made where, for example, the CPU 302 determines whether or not the setting values of the sheet holding unit 322 have been changed by accepting user operations at the setting screen 400 in FIG. 4A after the processing of S901 in FIG. 9A, in which case the CPU 302 ends the series of processes in FIGS. 9A and 9B without advancing to the processing of S902 and thereafter.

Although description has been made regarding an arrangement where, in response to a sheet holding unit 322 being closed, the size of the sheet held in the closed sheet holding unit 322 is detected, the detected sheet size and so forth is sent to the server 101, and the flow advances to the subsequent processing, but this is not restrictive. For example, assuming a configuration where the size of a sheet held in a sheet holding unit 322 can be detected even when the sheet holding unit 322 is open, an arrangement may be made where the detected sheet size is sent to the server 101 upon a predetermined amount of time having elapsed following the sheet holding unit 322 having been opened, following which the flow advances to the subsequent processing. Alternatively, a button to send the size of the sheet held in the sheet holding unit 322 to the server 101 may be provided on the operation unit 318 of the printing apparatus 102. Upon this button being pressed, the sheet size is sent to the server 101, and the flow advances to the subsequent processing.

The printing system according to the present embodiment described above includes a printing apparatus, and a server communicable with the printing apparatus. The user has first stored sheet attribute information (size, grammage, type, color, etc.) in the server beforehand.

In a case where a sheet holding unit provided to the printing apparatus is set such that the size of the sheet held in the sheet holding unit is not automatically detected by a sensor of the sheet holding unit, the server sends an instruction to the printing apparatus to cause the sheet size to be detected by the sensor. Accordingly, even in a case where setting have been made set such that the size of the sheet held in the sheet holding unit is not automatically detected by the sensor, a sheet attribute information stored beforehand can be easily set as the attribute information of the sheet held in the sheet holding unit.

The present invention is not restricted to the above embodiment, and various modifications (including organic combinations of embodiments) may be made based on the essence of the present invention, which are also encompassed by the scope of the present invention.

For example, while description has been made where size is detected (obtained) as one of the attribute information of the sheet held in the sheet holding unit, the attribute information is not restricted to one; a plurality of attribute information may be detected (obtained) and sent, the subsequent processing may be advanced based on the plurality of attribute information.

Also, description has been made that the information sent to the server 101 is the size of the sheet held in the sheet holding unit, for example, but this is not restrictive. If a sensor provided to the sheet holding unit is capable of detecting the color, grammage, type, or the like of the sheet, and attribute information such as the color, grammage, type, or the like of the sheet is registered in the sheet management table 600, attribute information such as the color, grammage, type, or the like of the sheet may be sent to the server 101, in accordance with the sheet size, and the sheet be decided based on the color, grammage, type, or the like of the sheet. Alternatively, an arrangement may be made where, for example, only the color information of the sheet is sent to the server 101 instead of the sheet size, and the sheet is decided based on the sheet color alone. That is to say, in a case of obtaining attribute information including at least one of the size, color, grammage, and type of the sheet as attribute information of the sheet held in the sheet holding unit, at least on attribute information other than this obtained attribute information may be included and set as setting values of the sheet holding unit.

Also, description has been made regarding an arrangement where the printing apparatus 102 and the external server 101 are connected by the network 105, but this is not restrictive. An arrangement may be made where part or all of the various types of control described above are executable by the printing apparatus 102 and the server 101 serving as a printing control apparatus built into the printing apparatus 102. Alternatively, a configuration may be made where part or all of the various types of control described above are executable by the printing apparatus 102 alone without going through processing at the side of the server 101 serving as a printing control apparatus. That is to say, the server 101 serving as a printing control apparatus may be included in the printing apparatus 102 or may be included in the image processing apparatus 104. Further, part or all of the various types of control described above may be executable by the printing apparatus 102 and multiple information processing apparatuses 104 connected via the network 103 such as a LAN, WAN, or the like, or via a wireless LAN or the like.

While various examples and embodiments of the present invention have been described above, the spirit and scope of the present invention are not restricted to any particular description in the present Specification.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of one or more of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-058489, filed Mar. 20, 2014, which is hereby incorporated by reference herein in its entirety.

What is claimed is:

1. A printing apparatus for performing printing on a sheet and which is connectable to a printing control apparatus, wherein the printing control apparatus includes a storing unit configured to store a plurality of pieces of sheet attribute information which includes information other than a sheet size, a first sending unit configured to send to the printing apparatus an instruction to transmit size information of a size of a sheet, an extracting unit configured to extract, based on the size information received from the printing apparatus, a sheet attribute information candidate from the plurality of pieces of sheet attribute information stored in the storing unit, and a second sending unit configured to send to the printing apparatus the sheet attribute information candidate extracted by the extracting unit, the printing apparatus comprising:
   a sheet holding unit configured to hold a sheet;
   a size obtaining unit configured to obtain size information of the sheet held in the sheet holding unit;
   a setting unit configured to set, based on the obtained size information, attribute information of the sheet held in the sheet holding unit, wherein the setting unit is configured to perform an automatic setting of the attribute information of the sheet held in the sheet holding unit, and is configured to set, based on the sheet attribute information candidate sent from the second sending unit, the attribute information to the sheet held in the sheet holding unit;
   a switching unit configured to switch, based on the obtained size information, the automatic setting of the attribute information to be valid or invalid; and
   a third sending unit configured to send to the printing control apparatus the obtained size information according to the instruction sent from the first sending unit, even in a case where, based on the obtained size information, the automatic setting of the attribute information is switched to be invalid by the switching unit.

2. The printing apparatus according to claim 1, further comprising a detection unit configured to detect that the sheet holding unit has been attached to a main body,
   wherein the sheet holding unit is attachably/detachably provided on the main body, and
   wherein, after the detection unit detects that the sheet holding unit has been attached, the third sending unit sends to the printing control apparatus the obtained size information.

3. The printing apparatus according to claim 1, wherein the sheet attribute information candidate includes at least one of a size, grammage, a color, and a type of a sheet.

4. The printing apparatus according to claim 1, wherein, in a case where a non-standard size is set by a user as a size of the sheet held in the sheet holding unit, the switching unit switches, based on the obtained size information, the automatic setting of the attribute information to be invalid.

5. The printing apparatus according to claim 1, further comprising a detection unit configured to detect that the sheet holding unit has been attached to a main body,
   wherein the sheet holding unit is attachably/detachably provided on the main body, and
   wherein, after the detection unit detects that the sheet holding unit has been attached to the main body, the third sending unit sends to the printing control apparatus the obtained size information.

6. A printing apparatus for performing printing on a sheet and which is connectable to a printing control apparatus, wherein the printing control apparatus includes a storing unit configured to store a plurality of pieces of first sheet attribute information, a first sending unit configured to send to the printing apparatus an instruction to transmit second sheet attribute information, an extracting unit configured to extract, based on the second sheet attribute information received from the printing apparatus, a sheet attribute information candidate from the plurality of pieces of first sheet attribute information stored in the storing unit, and a second sending unit configured to send to the printing apparatus the sheet attribute information candidate extracted by the extracting unit, the printing apparatus comprising:
   a sheet holding unit configured to hold a sheet;
   an obtaining unit configured to obtain second sheet attribute information of the sheet held in the sheet holding unit;
   a setting unit configured to set, based on the obtained second sheet attribute information, attribute information of the sheet held in the sheet holding unit, wherein the setting unit is configured to perform an automatic setting of the attribute information of the sheet held in the sheet holding unit, and is configured to set, based on the sheet attribute information candidate sent from the second sending unit, the attribute information to the sheet held in the sheet holding unit;
   a switching unit configured to switch, based on the obtained second sheet attribute information, the automatic setting of the attribute information to be valid or invalid; and
   a third sending unit configured to send to the printing control apparatus the obtained second sheet attribute information according to the instruction sent from the first sending unit, even in a case where, based on the obtained second sheet attribute information, the automatic setting of the attribute information is switched to be invalid by the switching unit.

7. The printing apparatus according to claim 6, further comprising a detection unit configured to detect that the sheet holding unit has been attached to a main body,
   wherein the sheet holding unit is attachably/detachably provided on the main body, and
   wherein, after the detection unit detects that the sheet holding unit has been attached, the third sending unit sends to the printing control apparatus the obtained second sheet attribute information.

8. The printing apparatus according to claim 6, wherein the sheet attribute information candidate includes at least one of a size, grammage, a color, and a type of a sheet.

9. The printing apparatus according to claim 6, wherein, in a case where a non-standard size is set by a user as a size of the sheet held in the sheet holding unit, the switching unit switches, based on the obtained size information, the automatic setting of the attribute information to be invalid.

10. A method for controlling a printing apparatus for performing printing on a sheet and which is connectable to a printing control apparatus, wherein the printing control apparatus includes a storing unit configured to store a plurality of pieces of sheet attribute information which includes information other than a sheet size, a first sending unit configured to send to the printing apparatus an instruction to transmit size information of a size of a sheet, an extracting unit configured to extract, based on the size information received from the printing apparatus, a sheet attribute information candidate from the plurality of pieces of sheet attribute information stored in the storing unit, and a second sending unit configured to send to the printing apparatus the sheet attribute information candidate extracted by the extracting unit, the method comprising:
   holding a sheet in a sheet holding unit;
   obtaining, via a size obtaining unit, size information of the sheet held in the sheet holding unit;
   setting, via a setting unit and based on the obtained size information, attribute information of the sheet held in the sheet holding unit, wherein the setting unit is configured to perform an automatic setting of the attribute information of the sheet held in the sheet holding unit, and is configured to set, based on the sheet attribute information candidate sent from the second sending unit, the attribute information to the sheet held in the sheet holding unit;
   switching, via a switching unit and based on the obtained size information, the automatic setting of the attribute information to be valid or invalid; and
   sending, via a third sending unit to the printing control apparatus, the obtained size information according to the instruction sent from the first sending unit, even in a case where, based on the obtained size information, the automatic setting of the attribute information is switched to be invalid by the switching unit.

11. A non-transitory computer-readable storage medium storing a program causing a printing apparatus to perform the method according to claim 10.

12. A method for controlling a printing apparatus for performing printing on a sheet and which is connectable to a printing control apparatus, wherein the printing control apparatus includes a storing unit configured to store a plurality of pieces of first sheet attribute information, a first sending unit configured to send to the printing apparatus an instruction to transmit second sheet attribute information, an extracting unit configured to extract, based on the second sheet attribute information received from the printing apparatus, a sheet attribute information candidate from the plurality of pieces of first sheet attribute information stored in the storing unit, and a second sending unit configured to send to the printing apparatus the sheet attribute information candidate extracted by the extracting unit, the method comprising:
   holding a sheet in a sheet holding unit;
   obtaining, via an obtaining unit, second sheet attribute information of the sheet held in the sheet holding unit;
   setting, via a setting unit and based on the obtained second sheet attribute information, attribute information of the sheet held in the sheet holding unit, wherein the setting unit is configured to perform an automatic setting of the attribute information of the sheet held in the sheet holding unit, and is configured to set, based on the sheet attribute information candidate sent from the second sending unit, the attribute information to the sheet held in the sheet holding unit;
   switching, via a switching unit and based on the obtained second sheet attribute information, the automatic setting of the attribute information to be valid or invalid; and
   sending, via a third sending unit to the printing control apparatus, the obtained second sheet attribute information according to the instruction sent from the first sending unit, even in a case where, based on the obtained second sheet attribute information, the automatic setting of the attribute information is switched to be invalid by the switching unit.

13. A non-transitory computer-readable storage medium storing a program causing a printing apparatus to perform the method according to claim 12.

14. A printing apparatus for performing printing on a sheet and which is connectable to a printing control apparatus, wherein the printing control apparatus includes a storing unit configured to store a plurality of pieces of sheet attribute information, a first sending unit configured to send to the printing apparatus an instruction to transmit size information of a size of a sheet, an extracting unit configured to extract, based on the size information received from the printing apparatus, a sheet attribute information candidate from the plurality of pieces of sheet attribute information stored in the storing unit, and a second sending unit configured to send to the printing apparatus the sheet attribute information selected by a user from the sheet attribute candidate extracted by the extracting unit, the printing apparatus comprising:
   a sheet holding unit configured to hold a sheet and configured to open and close with respect to a main body;
   a size obtaining unit configured to obtain size information of the sheet held in the sheet holding unit, wherein the size information is obtained according to detection information from a size detection sensor provided in the sheet holding unit or according to information manually input by a user;
   a setting unit configured to set attribute information of the sheet held in the sheet holding unit,
   wherein, based on the sheet attribute information sent to the printing apparatus from the second sending unit, the setting unit is configured to set the attribute information to the sheet held in the sheet holding unit,
   wherein, based on the size information obtained according to the detection information from the size detection sensor, the setting unit is configured to perform a first setting of the attribute information of the sheet held in the sheet holding unit, and wherein, based on the size information regarding a sheet width and a sheet height obtained according to the information manually input by a user, the setting unit is configured to perform a second setting of the attribute information of the sheet held in the sheet holding unit; and a third sending unit configured to send information, wherein, in a case where the attribute information of the sheet has been set by performing the first setting before the sheet holding unit is opened from the main body or in a case where the attribute information of the sheet has been set by performing the second setting before the sheet holding unit is opened from the main body, the third sending unit is configured to send, to the printing control apparatus and according to the instruction sent from the first sending unit after the sheet holding unit is opened and closed with respect to the main body, the size information obtained according to the detection information.

15. The printing apparatus according to claim 14, wherein the sheet attribute information stored in the storing unit includes at least one of a size, grammage, a color, and a type of a sheet.

16. The printing apparatus according to claim 14, wherein, in a case where a non-standard size is set by a user as a size of the sheet held in the sheet holding unit, the setting unit performs the second setting.

* * * * *